C. E. WHITE.
HARROW.
APPLICATION FILED FEB. 4, 1909. RENEWED SEPT. 30, 1916.
1,225,904.
Patented May 15, 1917.
3 SHEETS—SHEET 1.
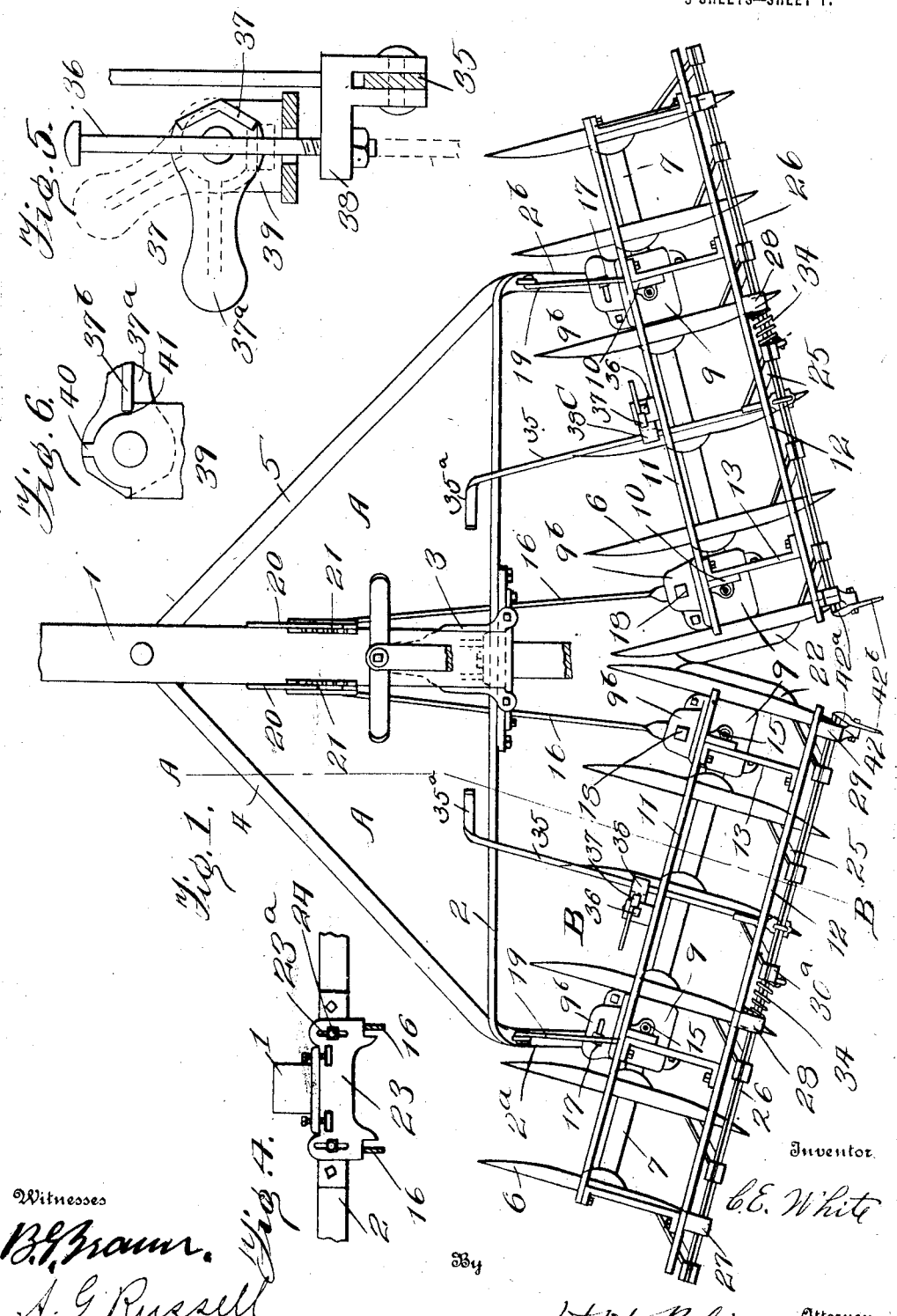

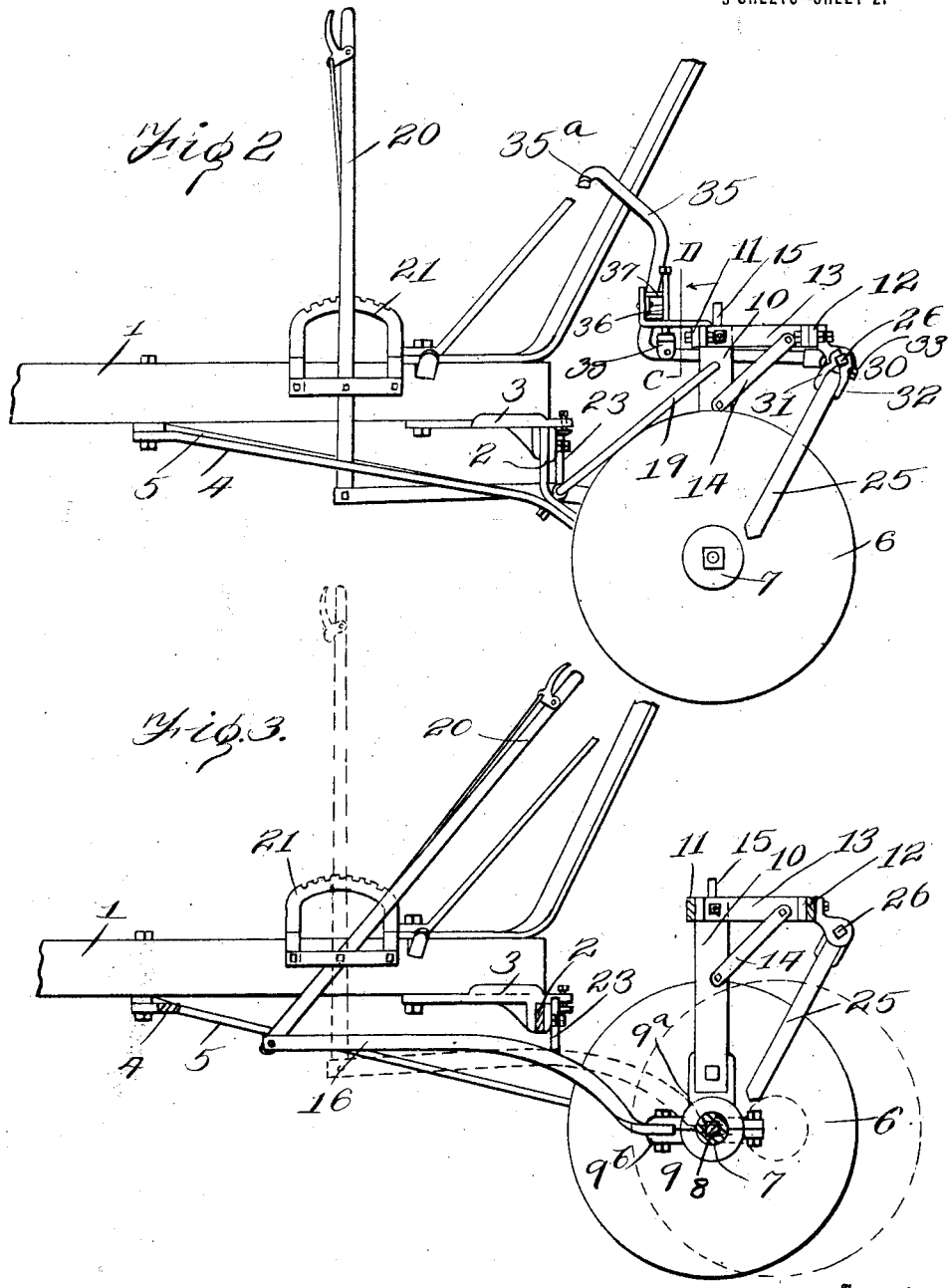

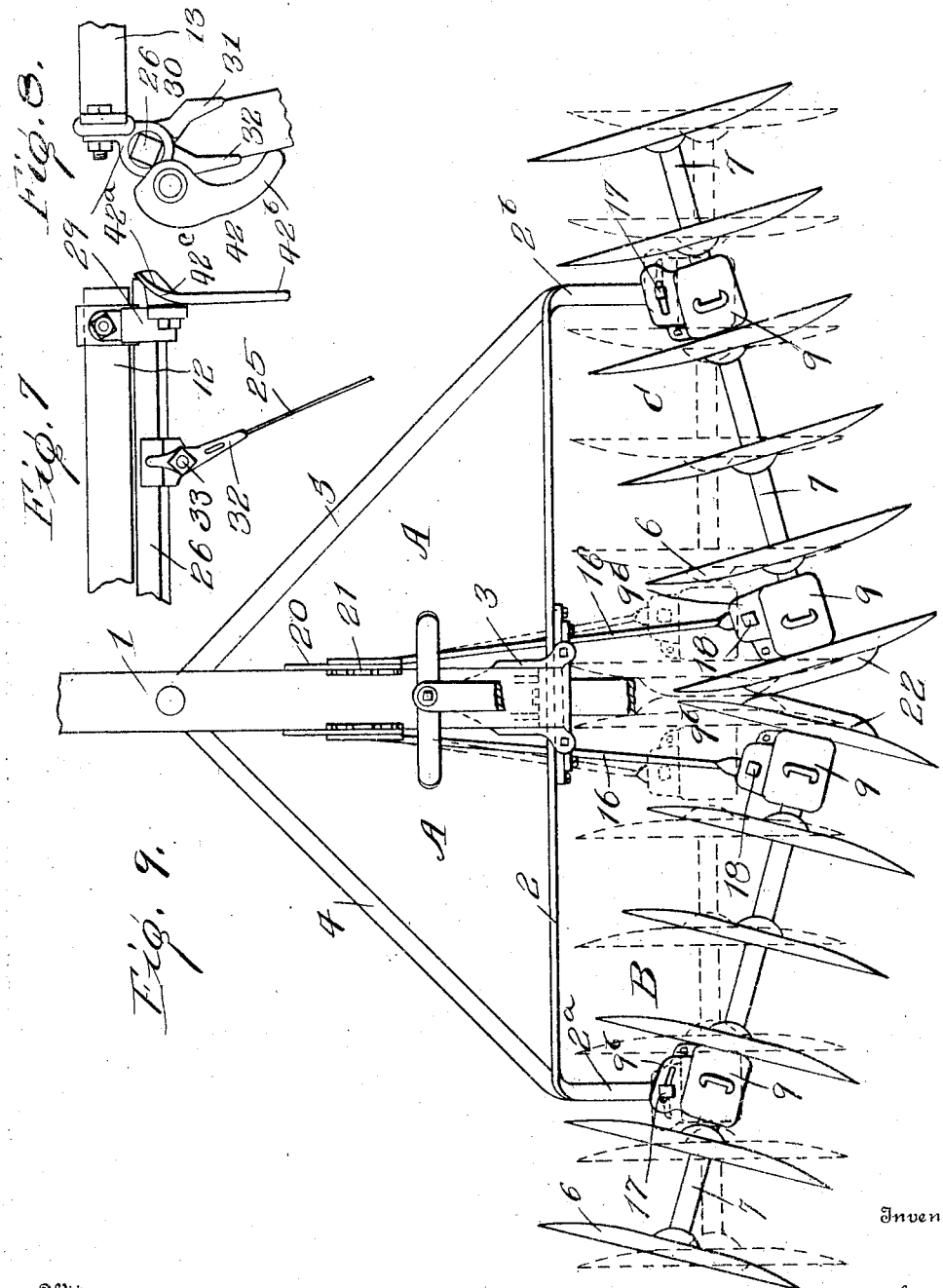

UNITED STATES PATENT OFFICE.

CHARLES E. WHITE, OF MOLINE, ILLINOIS, ASSIGNOR TO DEERE & MANSUR COMPANY, A CORPORATION OF ILLINOIS.

HARROW.

1,225,904.

Specification of Letters Patent.

Patented May 15, 1917.

Application filed February 4, 1909, Serial No. 476,063. Renewed September 30, 1916. Serial No. 123,194.

*To all whom it may concern:*

Be it known that I, CHARLES E. WHITE, a citizen of the United States, residing at Moline, in the county of Rock Island and State of Illinois, have invented certain new and useful Improvements in Harrows, of which the following is a specification, reference being had therein to the accompanying drawing.

This invention relates more particularly to the class of disk harrows, that is, harrows in which use is made of gangs of disks, or similar tools, oppositely arranged in relation to a main or draft frame arranged at the longitudinal center of the machine.

The principal objects of the invention are to improve the devices for connecting the gang frames to the draft frame, the construction of the gang frames and the means for controlling the scraper bars which are employed for cleaning the concave surfaces of the disks.

The nature of the various objects of the invention and the manner of attaining them will be readily understood from the following description in connection with the accompanying drawings which illustrate a preferred form of the invention.

Figure 1 is a plan view of the implement.

Fig. 2 is a left end elevation of the same.

Fig. 3 is a sectional view of the implement, the section being taken on the line A—B in Fig. 1.

Fig. 4 is a fragmentary view showing in rear elevation the adjustable abutment plate which coöperates with the draft bars.

Fig. 5 is a detail sectional view showing the locking device of one of the foot levers, the section being taken on the line C—D of Fig. 2.

Fig. 6 is a fragmentary elevation of the said locking device.

Fig. 7 is a detail view showing in perspective one of the cam levers for effecting longitudinal movement of the scraper bars.

Fig. 8 is a side elevation of the parts shown in Fig. 7.

Fig. 9 is a plan view showing the main parts of the draft frame and the lower parts of the gang frames in their respective extreme positions of angular adjustment.

The implement, as illustrated, comprises a draft frame A and the two tool gangs B and C together with means for operatively connecting the said frame and gangs.

The draft frame comprises a pole or tongue 1, a transverse bar 2 rigidly secured to the rear end of the pole by means of a casting 3 and having its ends extending downwardly and rearwardly as at $2^a$ and $2^b$ to connect with the tool gangs, and the diagonal bars 4 and 5 which are secured at their front ends to the pole and at their rear ends to the parts $2^a$ and $2^b$ of the transverse bar 2. The frame thus formed is a substantially rigid structure. Each of the tool gangs B and C comprises a plurality of disks 6 and interposed spacing spools 7, the said disks and spools being mounted upon a gang bolt 8 in the well known manner. Two of the spacing spools of each gang are fitted to receive two-part bearing boxes 9. The upper parts of the bearing boxes are formed with up-standing flanges $9^a$ to which are bolted the up-right bars 10. To the two up-standing bars of each gang is secured a rectangular frame comprising front and rear bars 11 and 12 extending longitudinally of the gang and the transverse bars 13. The ends of these transverse bars are bent at right angles and securely bolted to the bars 11 and 12. Each of the up-right bars 10 has its upper end disposed in the angle formed by the bar 11 and one of the transverse bars, and is securely bolted to the latter. Inclined brace bars 14 extend from the up-rights 10 to the transverse bars 13 to add stiffness to the structure.

In this construction the number of parts is reduced to a minimum, a single bolt serving to connect either end of the transverse bar to a longitudinal bar, and a second bolt serving to connect the up-right bar 10 to the transverse bar. At the same time the structure is very rigid by reason of the manner in which the parts are assembled, for it will be seen that by disposing the upper ends of the up-rights 10 in the angle formed by the bars 11 and 13 there is a mutual bracing action between the parts. There is no tendency of the transverse bars 13 to turn upon their securing bolts by reason of the stability of the axially united tool disks and the rigid connection therewith of the up-rights 10. Furthermore, this frame structure is composed entirely of wrought material and is not only simpler but lighter in weight than former constructions in which the transverse parts were in the form of castings, or in which castings were employed to connect the up-rights to the rectangular frame part.

Each of the bearing boxes is provided with an oil tube 15 which extends upward adjacent the up-right bar 10 to the level of the rectangular part of the gang frame. The upper and lower parts of the bearing boxes are formed with forwardly projecting flanges 9[b] which are spaced apart to receive the parts 2[a], 2[b] of the transverse bar 2, in the case of the out-side bearing boxes, and the rear ends of draft bars 16, in the case of the inner bearing boxes. The flanges 9[b] of the out-side bearing boxes are formed with slots through which pass the securing bolts 17 which pivotally unite the said out-side bearing boxes to the parts 2[a] and 2[b], thus forming a direct pivotal connection between the gangs and the rigid draft frame. Bolts 18 serve to pivotally connect the inner bearing boxes to the draft bars 16. Brace bars 19, which are secured at their lower ends to the transverse bar 2 of the draft frame and at their upper ends to the adjacent up-rights 10 of the gang frames, serve to hold the latter in suitable up-right position.

The forward ends of the draft bars 16 are pivotally connected to the lower ends of the hand-levers 20 by means of which the bars may be moved backward or forward to vary the angularity of the tool gangs. Each hand lever is provided with a notched segment 21 which, in connection with the usual locking bolt, serves to hold the lever in adjusted position.

Each of the gang frames carries at its inner end a bumper 22. These bumpers are in the form of large flat disks and are clamped against the inner disks of the respective gangs by the gang bolts in the well known way. These bumper disks are designed to engage each other in all the angular positions of the gang frames, and by making them of large diameter, it is possible to make them relatively flat and thin and still maintain them in proper engagement even when the gang frames are adjusted to positions of extreme angularity with respect to the line of draft. By making the bumpers thin and flat the gangs are not forced apart to the extent they otherwise would be when the gang frames are adjusted forward to positions of least angularity, and the leaving of a ridge of unworked soil between the inner disks of the two gangs is avoided.

In Fig. 9 of the drawing, the tool gangs are shown at the maximum angle, with respect to the lines of draft, to which they are commonly set in normal operation. The parts are so related that when the gangs are in this position the pivot bolts 17 are near the outer ends of their slots in the bearing boxes 9, the thrust of the gangs due to the inward component of the earth's reaction on the disks being taken by the bumpers 22. As the inner ends of the gangs are drawn forward by means of the hand levers toward the positions shown in dotted lines, the bumpers remain in engagement so that the pivotal movement of the gangs is necessarily accompanied by an endwise movement. Such endwise movement is provided for because the bearing boxes are free, by reason of their slots, to slip outward on the pivot bolts 17.

With this construction it is clear that the inward thrust of each gang frame is counteracted by that of the other gang frame so that the draft frame is relieved of stresses due to such end thrust of the gangs and the gang bearings are not subjected to the heavy wear that is incident to the transmission of such stresses in those prior constructions in which the end thrust of the gangs is taken by the draft frame. The draft frame, however, is made strong enough to take such stresses so that it will be possible, under certain circumstances, as for example, when working on a side hill, to set one gang at a different angle than the other. When this is done, it is clear that, if the bumpers are moved out of engagement, the gangs will crowd inward bringing the outer ends of the slots in the bearing boxes 9 into engagement with pivot bolts 17 so that the thrust of the gangs is taken directly by the draft frame. Probably in the majority of cases of this sort it will not be necessary to set the gangs at angles differing from each other enough to throw the bumpers 22 out of operative engagement with each other, because said bumpers, as stated, are of relatively large diameter and peculiarly shaped. It will be seen, nevertheless, that my improved construction, while it provides for the taking of the end thrust of the gangs by each other under most conditions of operation, also provides for the taking of such thrusts on the draft frame in the exceptional cases in which the bumpers will not serve this function. Thus in my improved harrow I secure all the advantages of the rigid draft frame having a direct pivotal connection with the gangs and of the independent adjustment of the gangs relative to each other, without subjecting the draft frame to the heavy stresses or the gang bearings to the heavy wear incident to the end thrust of the gangs, except in rare or extreme cases.

The bumpers are of the nature of abutting bosses. They have convex operative surfaces each of which approximately conforms to a surface struck with a radius slightly less than but approximating the radius of the curvature of the disk. Each is, therefore, thin at the axis, and widely extended radially. These bumpers or bosses are adapted to abut constantly against each other independently of the disks and irrespective of the angle at which the gangs are placed, and yet they permit each other to bodily slip radially while they are thus abutting. They differ from the bumpers proposed in earlier constructions which were approximately semi-spherical in shape projecting relatively long distances in from the innermost disks and consequently causing the gangs to interfere with each other, one frequently getting above or in front or in rear or below the other boss and bearing against the disk metal, the curvature being of such radius that it was impossible for either boss to readily slip past the other.

To prevent the inner ends of the tool gangs from rising when in operation contact plate 23 is secured to the casting 3 at the rear end of the pole so that its lower edge acts as a stop to limit the upward movement of the draft bars 16. This plate 23 is slotted at 23ª to receive the securing bolts 24 so that it may be vertically adjusted to permit the working of the implement with the tongue at different elevations. It will be observed that when the draft bars 16 are moved forward and backward their front ends necessarily follow an arcuate path with a consequent lowering and raising of said bars. To counteract this up and down movement of the bars, each of them is given a curvature adjacent the contact plate 23 such that its rear end moves in the same horizontal plane as it is moved backward and forward to vary the angularity of the gangs. In Fig. 3 of the drawing one of the draft bars is shown by full lines in the position it occupies when thrown forward and by dotted lines in the position occupied when thrown part way back.

The disks of the gang are provided with scrapers 25, which are rigidly connected to a rock shaft 26 mounted behind and a little below the bar 12 of the gang frame in bearing brackets 27, 28 and 29. The scrapers can be of any suitable shape, but as shown they are in the form of elongated blades each of which is held at its upper end in a clamp 30, which is adjustably secured to the rock shaft 26. These clamps consist of two parts 31, 32 and a bolt 33, the parts 31, 32 being shaped at their upper ends to fit shaft 26 and at their lower ends to fit the scraper bar or blade. One of the clamps of each gang, indicated on the drawing by 30ª has its part 32 formed with a lug or arm so that a spring 34 coiled around the rock shaft can engage with it and also some stationary part, as for instance, with the bearing bracket 28 of the frame, this spring acting both to tend to push the bar 26 longitudinally inward and also to rock it downward.

This rotation of the shaft 26 by means of the spring is such as to move the lower ends of the scrapers toward the axis of the disks, where they are in position to act upon the central parts of the disks. When it is desired to move them away from the centers and have them so situated as to act upon the peripheral parts of the disks it is accomplished as follows: 35 indicates a lever which, at its rear end, is rigidly secured to the rock shaft 26. This lever is shaped so as to extend from the rock shaft forward beneath the rectangular part of the gang frame, then upward to a position where it can easily be reached by the driver's foot, having at its front end a foot-rest 35ª. When the operator presses down upon this lever with his foot, he rocks the shaft 26 and moves the scrapers 25 over the faces of the disks from their innermost to their outermost positions; and inasmuch as the scrapers are held in these outer positions during much of the time of their use, I have combined with them a lock or stop which will hold them when so placed and which can be at any time easily and quickly disengaged to permit them to return to the center. This lock comprises a pin or bolt 36 and an opposing vibratable stop 37. The bolt 36 is carried by a bracket 38, which is secured to the foot lever 35, and which extends upward through a perforation in a bracket 29 which is mounted upon the front frame bar 11 and upon which the stop 37 is pivotally mounted. Said stop member is provided with a handle part 37ª which carries a flange or lug 37ᵇ adapted to engage shoulders 40 and 41 on the bracket 39, to limit the movement of said stop member.

When the foot lever is forced down so as to bring the locking bolt to the position shown in dotted lines in Fig. 5, the handle 37ª may be raised by the hand or the foot of the operator, thus bringing the stop 37 in position above the head of the stop bolt 36, and the parts are maintained in such position when the foot of the operator is removed from the lever 35 by the upward pressure of bolt 36 down to the spring 34. When it is desired to release lever 35, the operator depresses it slightly with his foot, thus allowing the stop member to fall under the action of gravity and free the bolt 36 for upward movement.

Provision is also made in the mechanism shown for holding all of the scrapers of the gang away from the disks. This is done by moving the rock shaft 26 longitudinally outward far enough to release the scrapers, and locking it against movement inward under the action of the spring 34. 42 is a plate pivotally mounted on the bearing bracket 29 and having a cam face 42ᵃ and handle part 42ᵇ. The cam part of this plate is arranged to engage the adjacent end of the rock shaft 26, and is so shaped as to force the shaft and with it the scrapers outward when the handle part 42ᵇ is thrown upward. If it is desired to hold the rock shaft in this outward position the movement of the plate 42 is carried far enough to bring the plain part 42ᶜ in engagement with the end of the shaft and thereby lock the latter in its position. When the shaft is thus held by the cam plate the scrapers, if in their normal position near the axis of the disks, are held out of contact with the said disks; at the same time the scrapers are free to oscillate, as before, under the action of the foot lever 35 and spring 34, but they now swing in planes and out of contact with the disk until they approach the peripheral parts thereof when they come into operative engagement.

What I claim is:

1. In a disk harrow, the combination of a draft frame, two oppositely arranged gang frames having their inner end parts vibratable vertically and horizontally and independently movable longitudinally, means for preventing the inner end of either gang from rising above horizontal lines predetermined relatively to the other gang, draft connections with the draft frame permitting all of the said movements of the disk gangs, and abutting devices for the inner ends of the gang frames adapted to constantly inter-engage, each abutting device being a widely extended flattened boss having a convex operative surface which at its edge fits closely to the convex surface of the innermost disk of a gang the central part being relatively flattened and the peripheral part being described with a radius approximating but slightly less than the radius of the convexity of the disk whereby the abutment bosses are relatively thin at the axial lines but are relatively wide in vertical planes and are adapted to abut constantly against each other independently of the disks irrespective of the angle of the gangs to permit each other to bodily slip radially while they are abutting.

2. In an implement of the class set forth, the combination of the draft frame, the gang frames pivotally connected to the draft frame, the curved draft bars each having a relatively downward curved rear end portion and connected at its rear end to the inner end of one of the gang frames, the hand levers pivotally mounted on the draft frames and connected to the forward ends of the said draft bars, and the vertically adjustable contact plate mounted on the draft frame above the draft bars and adapted to limit upward movement of said bars, the curvature of the draft bars being such that the limit of the upward movement of the inner ends of the gangs remains constant for all positions of the draft bars when they are adjusted backward and forward.

3. The combination of the axle, the spaced disks thereon, the upright bars or standards carried by the axle and disks, and the rectangular frame secured to the standards above the disks, said frame comprising front and rear bars arranged longitudinally of the disk axis, and transverse bars connecting the longitudinal bars, the upright bars being disposed in the angles formed by the longitudinal and transverse bars and being bolted to the latter.

4. The combination of the series of disks and interposed spacing spools, means for securing the disks and spools together on a common axis, the bearing boxes mounted on the spacing spools, the upright bars or standards rigidly secured to the bearing boxes, and the rectangular frame secured to the standards above the disks, said frame comprising front and rear bars arranged longitudinally of the disk axis, and transverse bars having their ends bent at right angles and bolted to the inner faces of the longitudinal bars, the upright bars being disposed in the angles formed by the longitudinal and transverse bars and being bolted to the latter.

5. The combination of the axle, the spaced disks thereon, the upright bars or standards carried by the axle and disks, and the rectangular frame secured to the standards above the disks, said frame comprising front and rear bars arranged longitudinally of the disk axis, and transverse bars having their ends bent at right angles and bolted to the longitudinal bars, the upright bars being disposed in the angles formed by the longitudinal and transverse bars and being bolted to one of said bars and braces connecting the vertical and transverse bars.

6. The combination of the axle, the spaced disks thereon, the upright bars or standards carried by the axle and disks, and the rectangular frame secured to the standards above the disks, said frame comprising front and rear bars arranged longitudinally of the disk axis, and transverse bars having their ends bent at right angles and bolted to the inner faces of the longitudinal bars, the upright bars being disposed in the angles formed by the longitudinal and transverse bars and being bolted to the latter.

7. The combination of the axle, the spaced disks thereon, the upright bars or standards carried by the axle and disks, and the rectangular frame secured to the standards above the disks, said frame comprising front and rear bars arranged longitudinally of the disk axis, and transverse bars having their ends bent at right angles and bolted to the longitudinal bars, the upright bars being disposed in the angles formed by the longitudinal and transverse bars and being bolted to one of said bars.

In testimony whereof I affix my signature, in presence of two witnesses.

CHARLES E. WHITE.

Witnesses:
 OSCAR F. LUNDAHL,
 J. H. BUSHONG.